United States Patent [19]
Wiggenhagen

[11] Patent Number: 6,082,171
[45] Date of Patent: Jul. 4, 2000

[54] STEERING ANGLE SENSOR DEVICE FOR MOTOR VEHICLES

[75] Inventor: Frank Wiggenhagen, Lüdenscheid, Germany

[73] Assignee: Leopold Kostal GmbH & Co. KG, Ludenscheid, Germany

[21] Appl. No.: 08/913,200

[22] PCT Filed: Mar. 1, 1996

[86] PCT No.: PCT/EP96/00856

§ 371 Date: Sep. 3, 1997

§ 102(e) Date: Sep. 3, 1997

[87] PCT Pub. No.: WO96/28335

PCT Pub. Date: Sep. 19, 1996

[30] Foreign Application Priority Data

Mar. 10, 1995 [DE] Germany .......................... 195 08 607

[51] Int. Cl.[7] .................................................. G01M 19/00
[52] U.S. Cl. .......................................................... 73/1.75
[58] Field of Search ................................ 73/1.75, 1.79, 73/118.1; 250/252.1

[56] References Cited

U.S. PATENT DOCUMENTS 4,970,906  11/1990  Shibata et al. ........................ 73/865.8
5,027,648   7/1991  Filleau .

FOREIGN PATENT DOCUMENTS 37 00 876 C2   5/1991   Germany .
43 03 342 A1   8/1994   Germany .

Primary Examiner—Robert Raevis
Attorney, Agent, or Firm—Herbert Dubno

[57] ABSTRACT

A steering angle sensor device (1) for motor vehicles has a steering angle sensor (3) by means of which the angular position of a motor vehicle steering wheel can be detected in relation to a full revolution (360°) and a counter unit (4) via which the number and direction of passages of the steering wheel through zero can be detected. In order as far as possible to avoid difficult initialisation by turning the steering wheel between its right and left-hand end positions, the steering angle sensor (1) of the invention has an initialisation device (6) consisting of a detection device approximately deriving running dynamic values detected by representative sensor components from the running position of the road wheels on either side of the motor vehicle affected by the steering wheel and supplying a corresponding signal, a comparator relating a signal provided by the detection device to the signal supplied by the steering angle sensor and corresponding to the actual angular position of the steering wheel and a setting device initialising the counter device when both signals correspond.

11 Claims, 2 Drawing Sheets

STEERING ANGLE SENSOR DEVICE FOR MOTOR VEHICLES

CROSS REFERENCE TO RELATED APPLICATIONS

This application is a national stage of PCT/EP96/00856 filed Mar. 1, 1996 and based, in turn, upon German national application 195 08 607.4 of Mar. 10, 1995 under the International Convention.

FIELD OF THE INVENTION

The invention relates to a steering angle sensor device for motor vehicles with a steering angle sensor element, by means of which the angular position of a motor vehicle steering wheel can be detected in relation to a full revolution (360 degrees) of the steering wheel, and with a counter unit through which the number and direction of the passages of the steering wheel through zero can be detected.

BACKGROUND OF THE INVENTION

Normally such a steering angle sensor device operates on an optical basis and serve for detecting the angular position of a steering wheel at a given moment. After its detection the current angular position is transmitted as serial information to control device connected to the sensor.

The angular position transmitted as serial information respectively the correspondingly transmitted angle value ranging between +/−720 degrees. The transmitted information includes the sign preceding the absolute value, a possible error code, and the initialization state. In most cases the steering wheel cannot be turned through the entire angle range, but only between approximately +/−540 degrees.

Analytically, the transmitted absolute value is composed of two information elements.

- a converted angle value from light sensors which give the exact angle within a complete steering wheel revolution from 0 to 360 degrees, whereby the degree of resolution 2.5 degrees;
- a counted value which characterizes the revolution segment wherein the steering wheel is moved. There are four revolution segments which cover the detectable range within −720 degrees and +720 degrees, whereby the first revolution segment lies between 0 to 360 degrees, the second revolution segment between 362.5 degrees to 720 degrees, the third revolution segment from −2.5 degrees to −360 degrees and the fourth revolution segment between −362.5 degrees to −720 degrees. However the second and the fourth revolution segment, cannot be fully traversed by the steering wheel.

The angle value is unequivocal due to the use of a code disk. The segment assignment is derived from the counted value. The counted value is always changed when a passage of the steering wheel through zero takes place.

Therefore it is essential for the correct indication of the steering wheel position that the counted value never be lost. Furthermore when the steering angle sensor device is set into operation, it is necessary to perform an initialization of the steering angle sensor by applying the same to the motor vehicle operational voltage, since otherwise the counted value would be set to a preferred value which would not at all correspond to the actual value at the moment.

The steering angle sensor device is initialized by turning the steering wheel from its right stop to the left stop, or from the left stop to the right stop, whereby three passages of the steering wheel through zero are performed therewith. Only after that is the assignment of the revolution segments is clearly established; the status of the initialization is set and the given steering wheel value can be processed as valid by the connected control devices.

The initialization state of the steering wheel angle sensor device can be forcibly reset in various ways during the practical operation of the motor vehicle.

- upon to the occurrence of a coding error, whereby the read-in light barrier signals assume implausible values, which can occur due to mechanical tolerances of the contact spiral, or the coding path to the optical steering wheel sensor device or due to the influence of an electric interference, e.g. from EMV-irradiation; and
- due to the occurrence of a voltage drop in the board network of the motor vehicle, wherefrom a RESET-process is triggered in the optical steering angle sensor device.

After a cancellation or a forced resetting of the initialization state optical steering angle sensor device, the noninitialized state of the combination consisting of the optical steering angle sensor device and the thereto connected control devices is brought to the attention of the driver, by means of a control light on the dash board. This control light turns off only when the driver of the motor vehicle performs a complete reinitialization, i.e. when the driver of the motor vehicle moves the steering wheel from its left end position to its right end position or vice versa, whereby then the three passages of the steering wheel through the zero position result, which allow a correct assignment of the revolution segments. Such a complete reinitialization of the optical steering angle sensor device is therefore expensive, and at the same time poses the question whether such a procedure should be imposed on the driver.

OBJECT OF THE INVENTION

It is the object of the invention to provide an improved further develop the steering angle sensor device for a motor vehicle so that the reinitialization by the driver of the motor vehicle, after a cancellation or a forced resetting of the counter, can be eliminated.

SUMMARY OF THE INVENTION

According to the invention this problem is solved with an initialization device consisting of a detection device approximately deriving running dynamic values detected by representative sensor components, provided therefor, from the running position of the road wheels on both sides of the motor vehicle and supplying a corresponding signal, a comparator relating a signal provided by the detection device to the signal supplied by the steering angle sensor and corresponding to the present angular position of the steering wheel, and a setting device initializing the counter device when both signals correspond. The current running position of the road wheels is consequently detected for the purpose of external reinitialization of the setting device. This current running position corresponds exactly to the angular position of the steering wheel between the left and the right end positions. It is therefore possible to assign the revolution segments of the steering wheel to the various running positions of the road wheels. Thereby the counted value to be set in the counter unit depending on the revolution segment, which can be established based on the present position of the road wheels of the motor vehicle, can be correspondingly set or corrected. In this way the reinitialization of the optical steering angle sensor device and the pertaining control device is performed without the active intervention of the driver of the motor vehicle.

The initialization device can be of simple construction when the detection device, the comparator and the setting device are comprised in an external control system.

It is advantageous for the precise detection of the running position of the road wheels of the motor vehicle to connect the detection unit to sensor elements measuring the wheel speed and the turning angle speed of the motor vehicle, since such sensor elements are anyway provided on the motor vehicle if it is equipped with an antilock or antiskid device.

It is possible to achieve a relatively simple connection, from the point of view of construction and switching techniques, between the external initialization device and the steering angle sensor device, when the unit of the steering angle device containing the steering angle sensor element and the counter is connected to the external initialization device by means of a serial interface leading to the connected control devices.

Such a procedure is particularly advantageous when the unit comprising the steering angle sensor element and the counter has a safety-monitoring device with a main and a secondary unit, each connected to a read-back input, whereby the read-back inputs also serve as input channels for signals from the external initialization device.

When the detection device of the initialization system or device, is designed so that for performing an initialization it detects a rectilinear running position of the road wheels, the expenses for switching and programming techniques used for the detection device of the initialization system can be considerably reduced.

In a method according to the invention for the initialization of a steering angle sensor device for motor vehicles, during the operation of which the angular position of a steering wheel is detected by a counter in relation to the full revolution of the steering wheel and the number and direction of the passages of the steering wheel through zero, the present running position of the road wheels of the motor vehicle is detected, the detected present running position of the road wheels is compared with the detected angular position of the steering wheel, and the counter is initialized according to the currently detected running position of the motor vehicle road wheels, as long as the detected present running position of the road wheels can be assigned to the detected present angular position of the steering wheel.

The wheel speed and the turning angle speed of the motor vehicle serve suitably for the detection of the running position of the road wheels.

The external initialization can be performed in a particularly reliable way when the initialization process is performed while the road wheels of the motor vehicle run in a straight line, whereby the counter is set and initialized to a value which corresponds to the average passage through zero of the steering wheel, while the road wheels are oriented exactly in the longitudinal direction of the motor vehicle.

For safety reasons it is advantageous when the process of reinitialization of the steering angle sensor device can take place only once after onset.

When carrying out an initialization process it is suitable at the beginning of the external initialization that a pulse of 20 ms be issued by the external control devices.

Advantageously this 20 ms pulse is recognized by the actual steering angle sensor device as a trigger signal for the initialization process when this pulse lasts 20 ms+/−2 ms.

The recognition of the 20 ms pulse as a signal for triggering an initialization process through the actual steering angle sensor device is recorded in the external control device, after which an acknowledgment pulse of 20 ms is given, as long as the recognition of the first 20 ms pulse takes place within a predetermined, timely correct tolerance window.

The acceptable time interval for the reception of the acknowledgment pulse should be 500 ms and the acceptable pulse duration 20 ms+/−2 ms. If these conditions are not met, then it is indicated that the steering angle sensor device is not in an initialized state.

SPECIFIC DESCRIPTION

Figure 1:
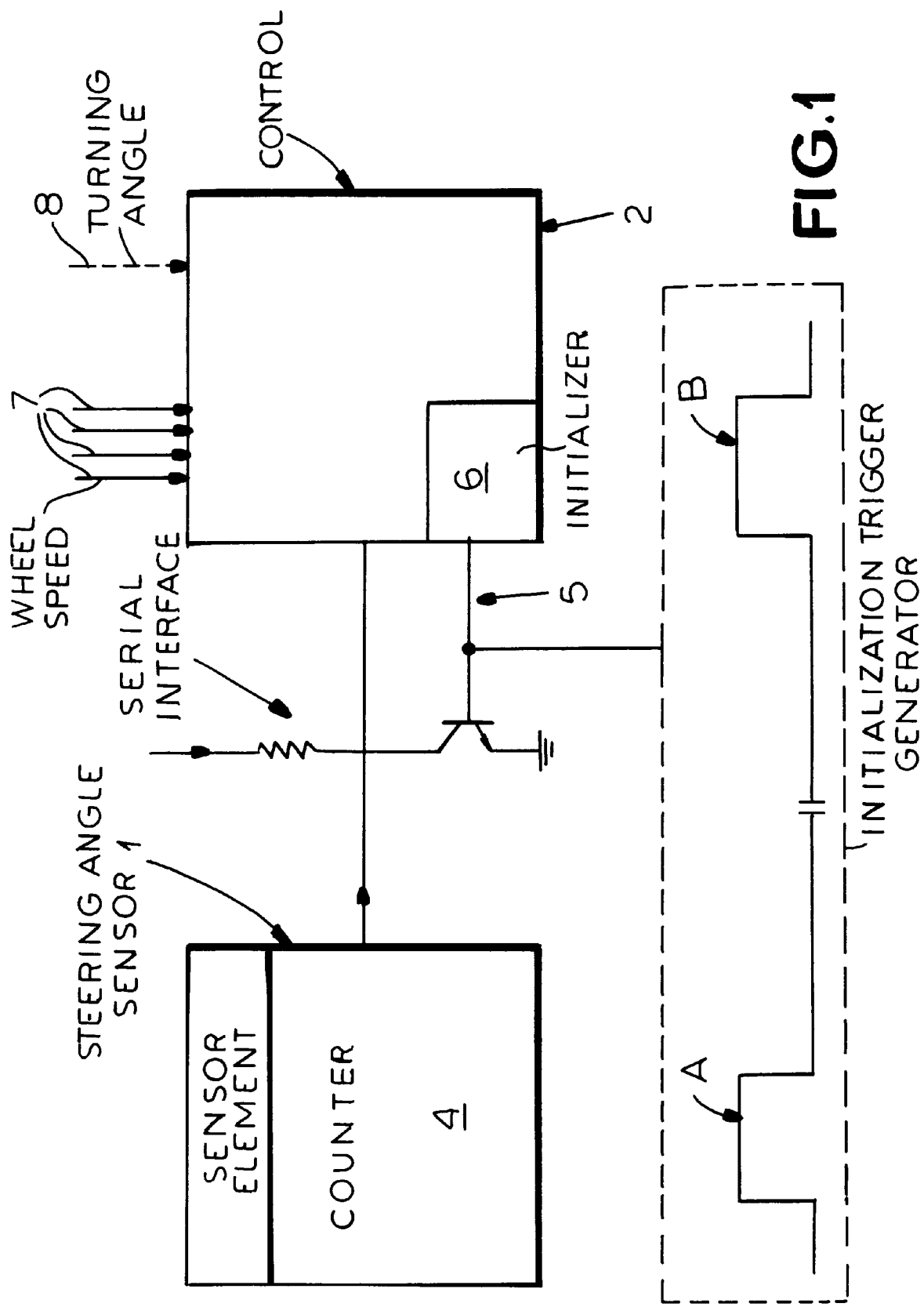
FIG. 1 is a block/circuit diagram representing in principle an optical steering angle sensor device according to the invention, in interaction with an external control device.
Figure 2:
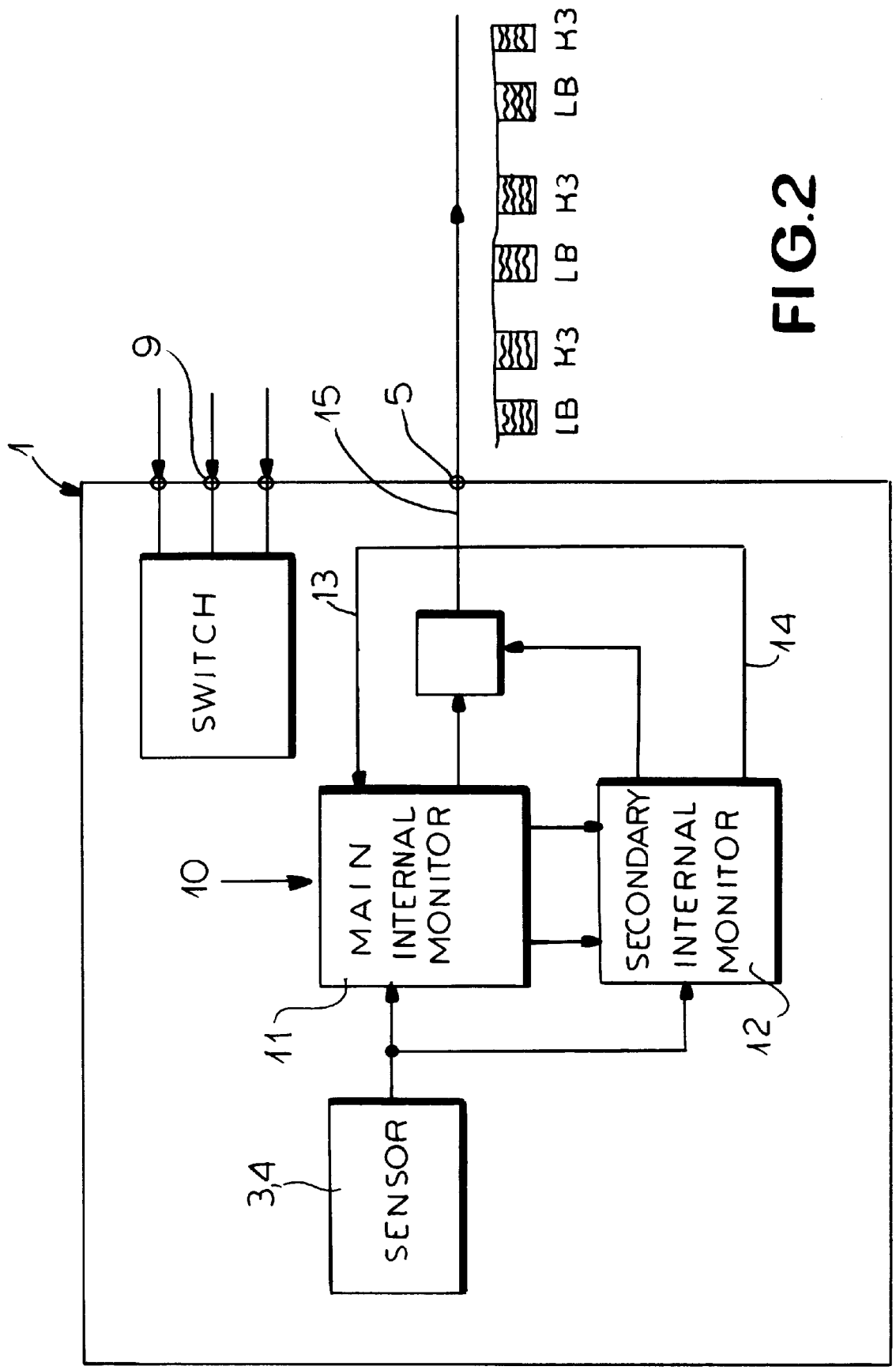
FIG. 2 is a block diagram of the optical steering angle sensor device represented in FIG. 1.

An optical steering angle sensor device shown in FIGS. 1 and 2 serves for detecting the angular position of a motor vehicle steering wheel at any given moment. In order to take into account of the momentary (instantaneous) angular position of the steering wheel for other control processes, a signal corresponding to the momentary angular position of the steering wheel is issued as serial information by the steering angle sensor device 1 to a further control device 2 connected to the steering angle sensor device 1.

The momentary (instantaneous) angular position of the steering wheel moves between the right extreme or end position and the left extreme or end position. A movement beyond these two extreme positions is prevented by stops. Starting out from a middle position of the steering wheel, which is assumed when the road wheels of the motor vehicle or of the steered axle of the motor vehicle are oriented precisely in the longitudinal direction of the motor vehicle, the steering wheel can be moved to the right, as well as to the left by approximately 1.5 revolutions. The compulsory result of this is the momentary (instantaneous) position of the steering wheel can vary between +540 degrees and −540 degrees. The steering angle sensor device or element 3 is laid out so that it can encompass an angle range between +720 degrees and −720 degrees.

Between the extreme right position and the extreme left position of the steering wheel, the steering wheel has to revolve approximately three times by 360 degrees. Based on the detectable angle range of the steering angle sensor element 3, the entire motion range of the steering wheel is subdivided into four revolution segments, whereby the first revolution segment comprises the range between 0 degrees and 360 degrees, the second revolution segment the range between 362.5 degrees and 720 degrees, the third revolution segment the range between −2.5 degrees and −360 degrees and the fourth revolution segment the range between −362.5 degrees and −720 degrees, whereby the second and the fourth revolution segments can not be fully traversed during the turning of the steering wheel. Therefore the absolute value for the present angular position of the steering wheel given as a serial information comprises correspondingly at first a recalculated angle value, resulting from nine light barriers, representing the precise angle within a total revolution from 0 to 360 degrees, whereby a resolution of 2.5 degrees exists. With this value the angular position of the steering wheel can be established. However with this value alone it is not possible to ascertain whether the steering wheel is in the first, second, third or fourth revolution segment. Therefore in addition to the absolute value indicating the momentary angle position of the steering wheel it is also necessary to take into account a counter value indicating in which revolution segment the steering wheel is located at the moment.

In contrast to the angle value, which due to the use of a code disk is unequivocal, the counter value characterizing the current revolution segment has to be derived. A change of the counter value occurs always when the steering wheel passes through zero, i.e. when the steering wheel moves from the first into the second, from the second into the third, from the third into the fourth revolution segment or vice versa. Therefore for the correct definition of the current angle position of the steering wheel it has to be insured that the stored counter value corresponds each time to the revolution segment wherein the steering wheel is positioned at the moment.

From the above results that the counter value must not be lost in any case. Further it is necessary to initialize the optical steering angle position sensor device 1 at the start of its operation, i.e. when it is first connected to the operating voltage of the motor vehicle.

The following is a heretofore known method for performing this initialization.

The driver turns the steering wheel from the extreme left position to the extreme right position or vice versa, so that during this rotation of the steering wheel three passages of the same through zero result. After that the assignment of the revolution segment is clearly established, consequently a status signal of initialization is set and the given steering angle can be processed as valid by the further control devices connected to the steering angle sensor device.

In addition to this conventional manner of performing an initialization of the optical steering angle sensor device, in the embodiment of the steering angle sensor device of the invention shown in FIG. 1 an external initialization is provided. In order to insure that such an external initialization is performed precisely and reliably, the external control device 2, which is equipped and serves for the external initialization, has to be able to recognize whether the signal corresponding to the position of the steering wheel at the moment given by the optical steering angle sensor device of the invention, corresponds to the actual running position of the road wheels of the motor vehicle and is therefore plausible.

In this regard it has to be established that the signal detected by a steering angle sensor element 3 of the steering angle sensor device 1, by means of which the actual angle of the steering wheel between 0 and 360 degrees is detected, is measured absolutely and therefore can be considered a comparatively safe signal. The problem here is that, based only on the angle position between 0 and 360 degrees, it can not be established in which of the four previously described revolution segments the steering wheel is actually located. Since due to the yet not performed initialization, the counter value defining the correct revolution segment is not yet registered in the counter unit 4 pertaining to the steering angle sensor device 1, it is necessary to measure other magnitudes or parameters in order to establish, respectively to determine in which of the previously described four revolution segments the steering wheel is located. For the determination of this revolution segment of the steering wheel serves the control device 2 connected via a serial interface 5 to the steering angle sensor device 1, which control device has an external initialization system 6.

Through the sensor elements 7, 8 for the detection of the wheel speed and the turning angle speed of the motor vehicle, this control device 2 is capable of detect the current running position of the motor vehicle wheels.

As long as now the vehicle runs in a straight line, the control device 2, because of its connection with the sensor elements 7, 8, can establish that the road wheels of the motor vehicle are oriented in the longitudinal direction of the motor vehicle. Further when the motor vehicle runs in a straight line, the steering wheel is forcibly in its central zero position. This approximate zero position, as well as the rectilinear run of the road wheels of the motor vehicle, are detected by the control unit 2, after which the control unit 2 by means of the initialization system 6 generates an initialization pulse, which is transmitted through the serial interface 5 to the steering angle sensor device 1. In this way the steering angle sensor device is initialized; in the counter unit 4 it is registered in which revolution segment the steering wheel is located; from this point on, each passage of the steering wheel from one revolution segment into the other is recorded, so that in the counter unit 4 it is each time determined it which revolution segment the steering wheel is at the moment.

For safety reasons, each time an external initialization should take place only once after the switch 9 is turned on.

The only connection of the optical steering angle sensor device 1 to the outside world, which could be used for initialization, is the serial interface 5, through which the optical steering angle sensor device 1 is for instance connected to the external control device 2. In addition thereto the optical steering angle sensor device 1 has an internal safety monitoring device 10, with a main unit 11 and a secondary unit 12. Regarding the interface 5, read-back inputs 13 and 14 are provided in the main unit 11 and the secondary unit 12.

These read-back inputs 13, 14 can now also be used to detect foreign, i.e. external occurrences on the data channel 15.

The actual data signal in the data channel 15 is low-active, i.e. in the transmission pauses the voltage of the data channel 15 is at the board voltage. Consequently a data signal related to measurements from the optical steering angle sensor device 1 can also be perfectly recognized.

The initialization signal given by the external initialization system 6 assigned to the control unit 2 consists now of two or three components.

For triggering the initialization a 20 ms pulse A is generated, which for this time interval sets the serial interface 5 of the steering angle sensor device 1 on low voltage. If the optical steering angle sensor device 1 recognizes this 20 ms pulse A with a tolerance of +/−2 ms and all the other limit conditions required for an external initialization are met, the optical steering angle sensor device 1 activates the status bit which indicates an initialized state of the optical steering angle sensor device 1; as far as required, in the counter unit 4 registering the revolution segments, the revolution segment comprising the rectilinear run is set.

This reaction of the optical steering angle sensor device 1 is registered in the control device 2; if the status bit characterizing the initialization was set in the correct tolerance window, the control device 2 generates a second acknowledgment pulse which also lasts 20 ms.

The reception of this acknowledgment pulse has to take place in the optical steering wheel sensor device 1 within 500 ms after the reception of the 20 ms pulse triggering the initialization. A duration in time of the second pulse B is also checked by the steering angle sensor device 1 with a tolerance of +/−2 ms.

If the time interval between the 20 ms pulse A triggering the initialization and the acknowledgment pulse B becomes too long, i.e. it surpasses for instance 500 ms, or if the duration of the acknowledgment pulse B does not equal 20 ms +/−2 ms, an error is recognized in the external initialization sequence. As a result of this error the status bit indicating an initialized state of the steering angle sensor device 1 is again cancelled and optionally the counter unit 4 is reset to its original value.

A further initialization by means of the external initialization system 6 is again possible only when before that the switch 9 was once turned off/on. However a mechanical initialization by turning the steering wheel between the right and left extreme positions is always acceptable.

Consequently for achieving an external initialization the duration in time of the 20 ms pulse A triggering the initialization, as well as of the acknowledgment pulse B have to be respected; furthermore the time interval between the two mentioned pulses has to be within the acceptable tolerance window of 500 ms.

I claim:

1. A method for the initialization of a steering angle sensor device of a motor vehicle during operation thereof whereby an angular position of a motor vehicle steering wheel is detected in relation to a full 360° revolution of the steering wheel and a number and direction of zero passages of the steering wheel are detected by a counter unit, the method comprising:

detecting a current running position of road wheels of the vehicle;

comparing the detected current position of the road wheels with a detected current angular position of the steering wheel; and initializing the counter unit upon association of the detected current running position of the road wheels with the current angular position of the steering wheel, corresponding to the detected current running position of the road wheels of the motor vehicle, the running position of the road wheels being detected from the wheel speed and the turning angle speed of the motor vehicle.

2. The method according to claim 1 which is carried out when the road wheels are moving in a straight line, whereby the counter unit is initialized to a value which corresponds to an average number of passages through zero of the steering wheel.

3. The method according to one of claim 1 which is implemented only once after a steering angle sensor device is turned on by switching a switch.

4. The method according to claim 1 wherein for the initialization a 20 ms pulse is generated.

5. The method according to claim 4 whereby the 20 ms pulse is recognized when it lasts 20 ms +/−2 ms.

6. The method according to claim 5 whereby the recognition of the 20 ms pulse is externally registered and an external acknowledgment pulse of 20 ms duration is issued when the recognition takes place within a timely correct tolerance window.

7. The method according to claim 6 whereby an acceptable time frame for the reception of the acknowledgment pulse is 500 ms and an acceptable pulse duration of the acknowledgment pulse equals 20 ms+/−2 ms.

8. A steering angle sensor system for a motor vehicle having a steering wheel rotatable through more than one full revolution in a normal operating range and having road wheels which are turned by said steering wheel, said system comprising:

a steering angle sensor element operatively connected with said steering wheel for indicating an angular position thereof within a complete revolution;

a counter connected to said sensor element for counting zero passages of the steering angle sensor element;

means for detecting wheel speed and turning angle speed for detecting a current running position of the road wheels; and means for comparing said current running position of said road wheels with a current angular position of said steering wheel for initializing said counter upon said current running position corresponding to said current angular position.

9. The system defined in claim 8 wherein said element and said counter form a unit and said means for comparing and for initializing form an external initializer connected to said unit by a serial interface.

10. The system defined in claim 9 wherein said unit has a safety monitoring device with a main unit and a secondary unit, each connected to a read-back input, whereby the read-back inputs serve as input channels for signals coming from the external initializer.

11. The system defined in claim 8 wherein said means for comparing and initializing detects a rectilinear position of said road wheels for initializing said counter.

* * * * *